United States Patent
Brinkley et al.

(10) Patent No.: US 7,933,222 B2
(45) Date of Patent: Apr. 26, 2011

(54) INFORMATION ENTRY FOR NETWORK OPTIMIZATION

(75) Inventors: James King Brinkley, Charleston, SC (US); Elliott Bryant, Suwanee, GA (US); Robert Bickerstaff, Atlanta, GA (US); Paramasiviah Harshavardhana, Marlboro, NJ (US); Song C. Chen, East Brunswick, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 712 days.

(21) Appl. No.: 11/431,933

(22) Filed: May 10, 2006

(65) Prior Publication Data

US 2007/0263543 A1 Nov. 15, 2007

(51) Int. Cl.
*H04L 12/28* (2006.01)
(52) U.S. Cl. .......................................... 370/254
(58) Field of Classification Search .................... 370/254
See application file for complete search history.

(56) References Cited

U.S. PATENT DOCUMENTS

| | | | |
|---|---|---|---|
| 5,274,643 A * | 12/1993 | Fisk | 370/238 |
| 5,357,564 A * | 10/1994 | Gupta et al. | 379/188 |
| 5,802,513 A * | 9/1998 | Bowie, III | 707/3 |
| 6,681,392 B1 | 1/2004 | Henry et al. | |
| 6,756,998 B1 | 6/2004 | Bilger | |
| 2003/0217125 A1* | 11/2003 | Brancati et al. | 709/220 |
| 2004/0039809 A1 | 2/2004 | Ranous et al. | |
| 2004/0236547 A1* | 11/2004 | Rappaport et al. | 703/2 |
| 2005/0216380 A1* | 9/2005 | Morris et al. | 705/34 |
| 2006/0062211 A1* | 3/2006 | Manthoulis et al. | 370/386 |

OTHER PUBLICATIONS

"VPIsystems Transport Layer Products—VPItransportMaker Ring™."
"VPIsystems® connecting people tools & data: Metro DWDM ring network design options."
"VPIsystems® connecting people tools & data: Metro DWDM ring network showing DWDM ring."
"VPIsystems® connecting people tools & data: Metro DWDM ring network design summary."

* cited by examiner

*Primary Examiner* — Derrick W Ferris
*Assistant Examiner* — Peter Cheng
(74) *Attorney, Agent, or Firm* — Parks IP Law LLC; Jennifer P. Medlin, Esq.

(57) ABSTRACT

A telecommunications network model receives data regarding a telecommunications network and a customer's use of that network. The data includes information about nodes, link between nodes, tariffs, and customer usage. The received data is utilized to create a model of the telecommunications network. The model may then be utilized to optimize a customer's use of the network, optimizing for a lowest cost solution.

15 Claims, 9 Drawing Sheets

INFORMATION ENTRY FOR NETWORK OPTIMIZATION

RELATED APPLICATIONS

This patent application is related to the non-provisional U.S. patent application Ser. No. 11/1431,415, now U.S. Pat. No. 7,742,433, entitled "Optimization for Network Utilization", which is herein incorporated by reference.

BACKGROUND

In the world of telecommunications, there are many paths to route data and/or voice from point A to point B. For customers who require dedicated bandwidth, the paths from point A to point B are more certain. Such a customer may pay for dedicated channels and/or systems within a telecommunications network in order to ensure reliable access to communications. Alternatively, a customer may pay for communications usage "on demand," paying for what is actually used. As an example, a large customer having multiple locations may require dedicated data and/or voice conduits between and among various customer facilities. These facilities may be located within the same metropolitan area, or across multiple states or provinces.

FIG. 1 depicts one possible network use configuration for a customer utilizing data and voice communications. Other network use configurations for other customers may be much more complex. Here, customer facilities 202, 203, 204, and 205 are interconnected via nodes 201a, 201b, 201c, and 201d (e.g., central offices, switches, etc.). Communications between the facilities may be routed along pre-defined circuits, moving from point-to-point via electrical, optical, wireless, or other transmission mediums. For example, communications between facility 203 and one of retail locations 204 may be routed from the facility to node 201b, and then directly from 201b to 201c via link 'bc,' and then to the retail location 204. As communications data traverses the path, the customer may incur charges in accordance with tariffs and/or contracts.

The network use configuration of FIG. 1 enables data and voice communications to travel directly from point-to-point, routed based on the initiating and terminating points. This may not, however, be the most cost-effective route for communications to take. An alternative network use configuration for the same customer is depicted in FIG. 2. Here, rather than route communications along myriad point-to-point paths, customer data and voice are routed in a systematized ring formation. For example, communications traveling from facility 202 to one of retail locations 204 may be routed through all four nodes shown, 201a, 201b, 201d, and 201c. Although data traveling around the ring may be routed through more switches or central offices along the way, the end result may be more cost effective and/or reliable for either the customer and/or the provider of communications services. Such a routing formation may be a self-healing multi-nodal alternate route topology ring, or simply be called a ring. Such a topology ring may also be described as a SMARTRing$^{SM}$, or WaveLengthRing$^{SM}$, both services provided at least by BellSouth Corporation.

Although two network use configurations are shown here, the number of possible configurations and routing formations may be limitless, especially as the size and complexity of a customer's network grows. Therefore, selecting a preferred use configuration (e.g., cheapest, most reliable, etc.) may be a taxing and/or confusing exercise. Taking multiple factors into consideration further complicates the task—factors which may include existing network layout, customer usage, fixed and incremental costs, tariffs, and so forth.

There is a need in the art for automated methods for determining a preferred use configuration for routing communications data within a telecommunications network.

SUMMARY

Methods and systems according to embodiments of the invention determine a preferred network use configuration using an optimization of a model of the network. In some embodiments, a software application may receive node, linkage, and cost information associated with a communications network. In addition, previous network use information is also received by the software application. An optimization is performed in order to minimize price based on previous and/or forecasted use. The resulting preferred network use configuration may be displayed for review.

BRIEF DESCRIPTION OF THE DRAWINGS

The foregoing brief summary of the invention, as well as the following detailed description, is better understood when read in conjunction with the accompanying drawings, which are included by way of example, and not by way of limitation with regard to the claimed invention. In the accompanying drawings, the same or similar elements are labeled with the same reference numbers.

DETAILED DESCRIPTION

Figure 1:
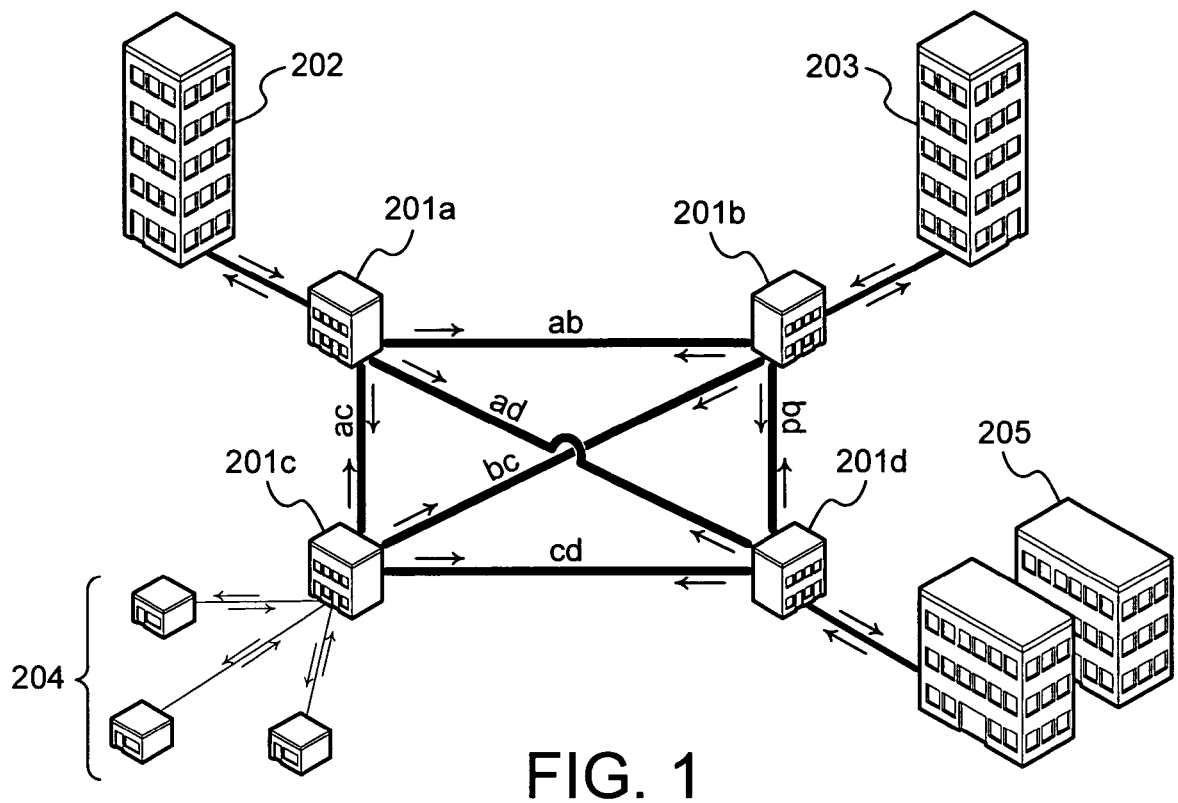
FIGS. 1 and 2 depict examples of customer network use configurations.
Figure 2:
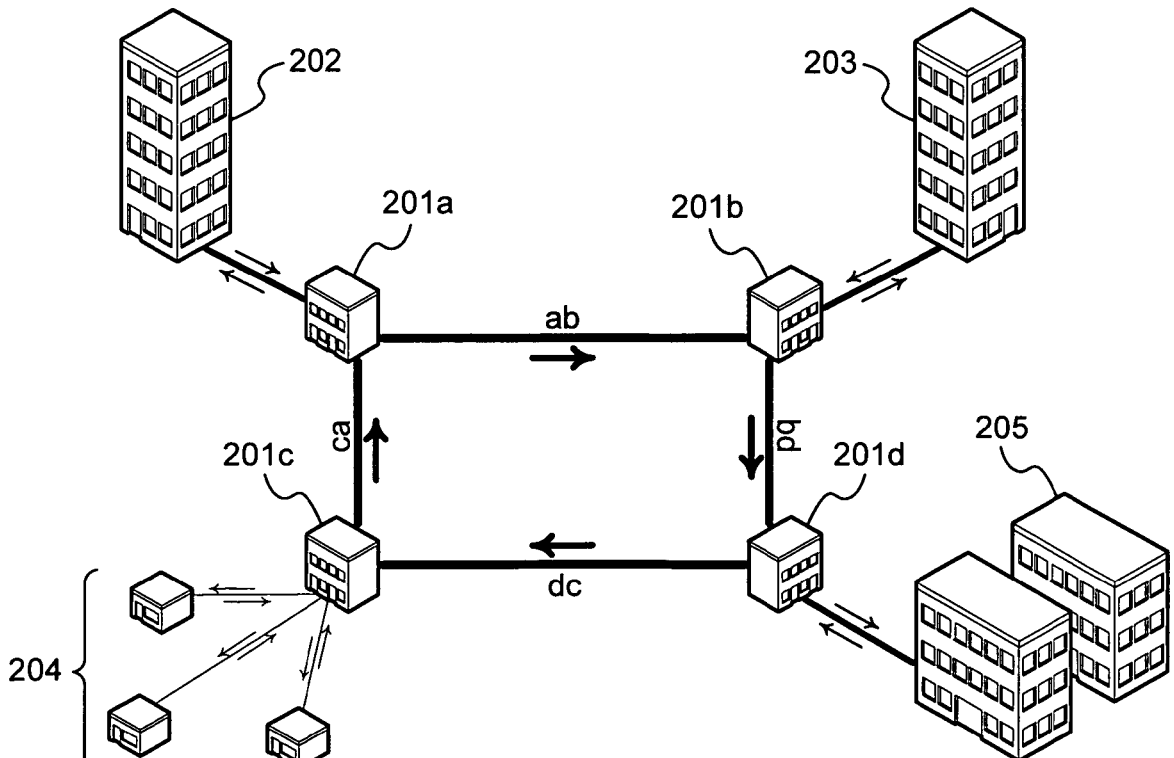
Figure 3:
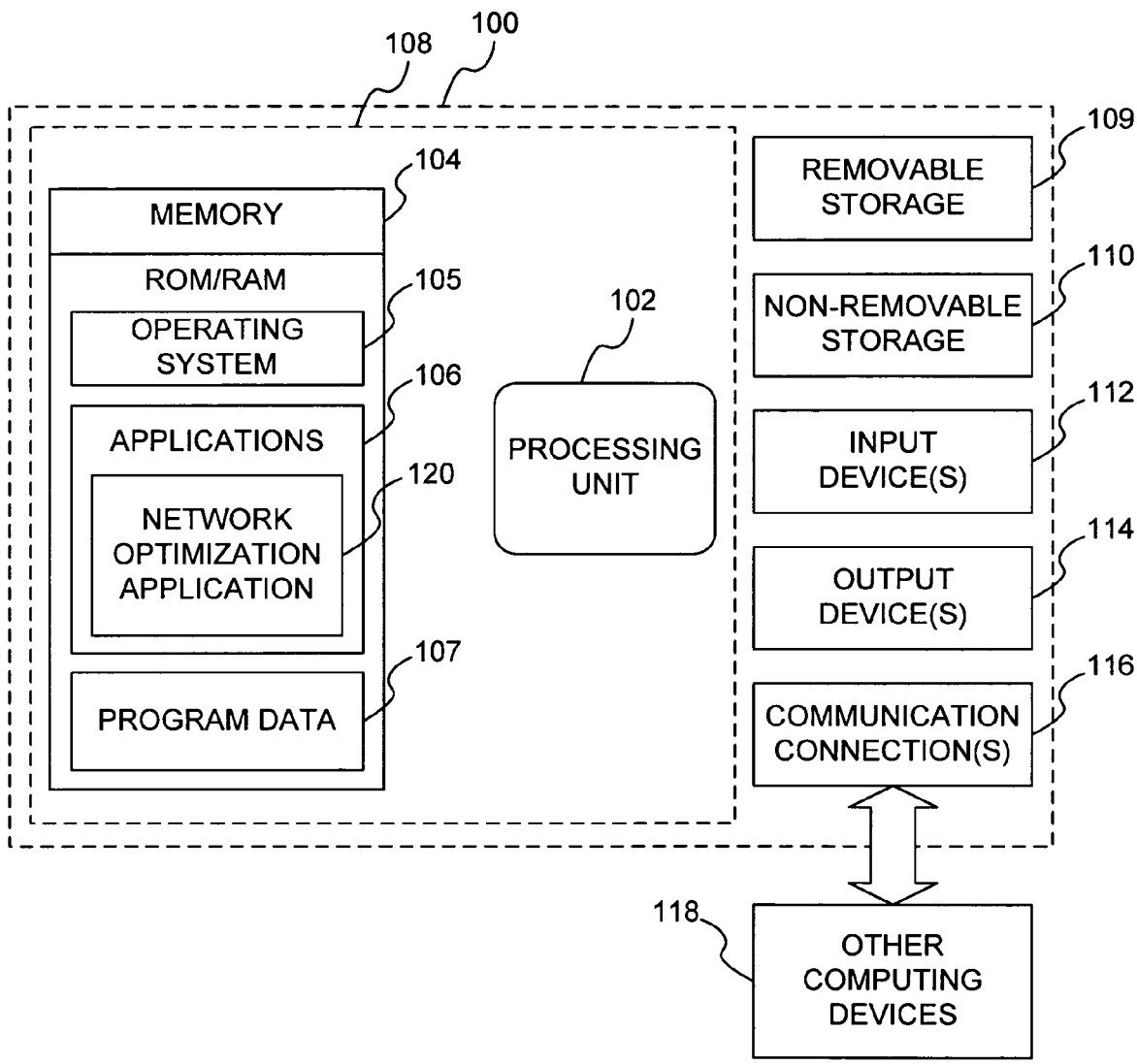
FIG. 3 depicts an exemplary operating environment in which one or more embodiments may be implemented.

FIG. 3 depicts an exemplary operating environment in which one or more embodiments may be implemented. In this example, the operating environment comprises a computing device 100 which may work alone or with other computing devices 118. Computing device 100 comprises memory storage 104 coupled to processing unit 102. Any suitable combination of hardware, software, and/or firmware may be used to implement memory 104, processing unit 102 and other components. By way of example, memory 104, processing unit 102, and/or other components may be implemented within computing device 100 as shown, or may be implemented in combination with other computing devices 118. The systems, devices, and processors shown are used merely as examples.

Generally, program modules may include routines, programs, components, data structures, and other types of structures that perform particular tasks or implement particular abstract data types. Moreover, embodiments may be practiced with other computer system configurations, including hand-held devices, multiprocessor systems, microprocessor-based or programmable consumer electronics, minicomputers, mainframe computers, set-top boxes, and so forth. Embodiments may also be practiced in distributed computing environments where tasks are performed by other computing devices 118 that are linked through a communications network. In a distributed computing environment, program modules may be located in both local and remote memory storage devices.

Embodiments, for example, may be implemented as a computer process or method (e.g., in hardware or in software), a computing system, or as an article of manufacture, such as a compute program product or computer readable media. The computer program product may be a computer storage media readable by a computer system ad encoded with a compute program of instructions for executing a process on computing device 100.

With reference to FIG. 3, depending on the configuration of the computer device 100, memory 104 may be volatile (e.g., Random Access Memory (RAM)), non-volatile (e.g., Read-Only Memory (ROM), Flash, etc.), or some combination thereof. Memory 104 serves as a storage location for operating system 105, one or more applications 106, and includes program data 107, as well as other programs. In one embodiment, applications 106 includes network optimization application 120.

Although the basic computing device configuration is contained within a dashed-line box 108, computing device 100 may include additional features and functionality. For example, computing device 100 may include additional data storage components, including both removable storage 109 (e.g., floppy disks, memory cards, compact disc (CD) ROMs, digital video discs (DVDs), external hard drives, universal serial bus (USB) key drives, etc.) and non-removable storage 110 (e.g., magnetic hard drives).

Computer storage media may include computer readable instructions, data structures, program modules, or other data. Memory 104, removable storage 109, and non-removable storage 110 are all examples of computer storage media. Further examples of such media include RAM, ROM, electrically-erasable programmable ROM (EEPROM), flash memory, CD-ROM, DVD, cassettes, magnetic tape, magnetic disks, and so forth. Any such computer storage media may be accessed by components which are part of computing device 100, or which are external to computing device 100 and connected via a communication link (e.g., Bluetooth, USB, parallel, serial, infrared, etc.). Computing device 100 also includes input devices 112, such as keyboards, mice, pens, microphone, touchpad, touch-display, etc. Output devices 114 may include display, speaker, printers, and so forth. Additional forms of storage, input, and output devices may be utilized.

Computing device 100 also includes one or more communication connections 116 which allow the computing device to communicate with other computing devices 118, such as over a network (e.g., a local area network (LAN), the Internet, etc.). Communication media, in the form of computer readable instructions, data structures, program modules, or other data in a modulated data signal, may be shared with and by device 100 via communication connection 116. Modulated data signal may mean a signal that has one or more of its characteristics set or changed in such a manner as to encode information in the signal, and may include a modulated carrier wave or other transport mechanism. Communication connection 116 may be comprised of hardware and/or software enabling either a wired (e.g., Ethernet, USB, Token Ring, modem, etc.) or wireless (e.g., WiFi, WiMax, cellular, acoustic, infrared, radio frequency (RF), etc.) communication conduit with other devices 118.

Figure 4:
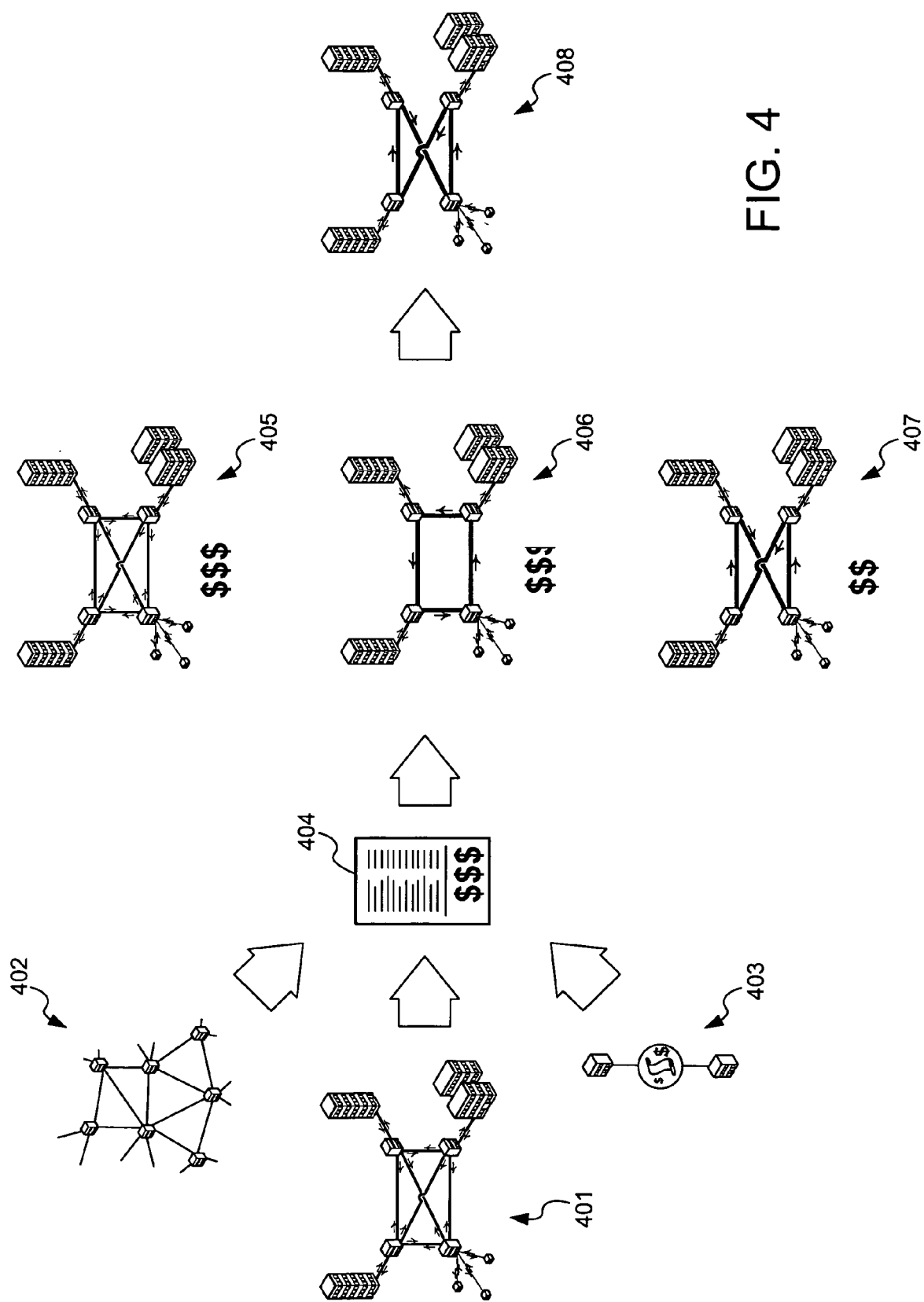
FIG. 4 depicts a method for determining a preferred network use configuration according to one or more embodiments of the invention.

FIG. 4 illustrates a method for arriving at a preferred network use configuration according to one or more embodiments. The network optimization application 120 may perform some or all of the method illustrated here. Initially, the network optimization application 120 considers current network usage information 401 in light of network information 402 and cost and tariff information 403. Using this information, the network optimization application 120 produces an estimate 404 of the current cost and/or fees associated with the current network usage. The network usage information 401 may represent the usage of a single customer, groups of customers, or even all users of the telecommunications network. Network information 402 may include information about the geographic location of network nodes (e.g., switches, routers, central offices, etc.) as well as information about whether and how nodes may be linked to each other. Cost and tariff information 403 may include information on costs and/or fees associated with data traversing various nodes and links in the network. The estimate 404 may or may not represent the actual dollar amount charged to a particular customer for their usage, since the actual amount may take into consideration discounts and other factors difficult to model. Nevertheless, the estimate 404 provides a starting point to which subsequent proposed use configurations can be compared.

In order to determine a preferred network use configuration, the network optimization application 120 mathematically reduces the complicated network information 402 and network usage information 401 down to a mathematical model in order to apply a set of solvable mathematical equations to arrive at a preferred (e.g., lowest cost) network use configuration. Generally, performing a network optimization involves determining one or more objective functions for which a minimum or maximum is desired. Multiple objective functions may be combined to create a single composite objective function. In optimizing the objective function, a set of unknowns or parameters is considered, such as data path used, amount of bandwidth required, and so forth. Also, a set of constraints is considered, which may include network node locations, available equipment, and so forth. Ultimately, an optimization can involve finding the values for the parameters which minimize or maximize the objective function while satisfying the constraints.

Network optimization application 120 may iterate over thousands or millions of permutations and combinations of parameter values to arrive at the preferred solution. In so doing, the application 120 may additionally consider certain technical and/or business rules to further constrain the possible solutions. Such constraints may take into consideration the types of nodes and interfaces existing within the network. Further, such rules may indicate a preference for certain use configurations due to reasons or factors not easily modeled.

Once a preferred network is proposed, a customer may use the network optimization application 120 to drill into a proposed solution. The solution may include information about proposed systems, circuits, pricing plans, and so forth. Proposed systems may include a variety of topology rings, as well as other forms of logical and/or physical rings for transporting customer voice and data in a reliable and less expensive fashion.

In FIG. 4, among the network use configurations which may be considered are configurations 405, 406, and 407. In the end, the network configuration 408 which represents the lowest fee charged to the customer wins out. At this point, the customer may opt for the network use configuration 408 recommended based on current network usage 401, and subsequently save money and/or increase communications reliability.

Figure 5:
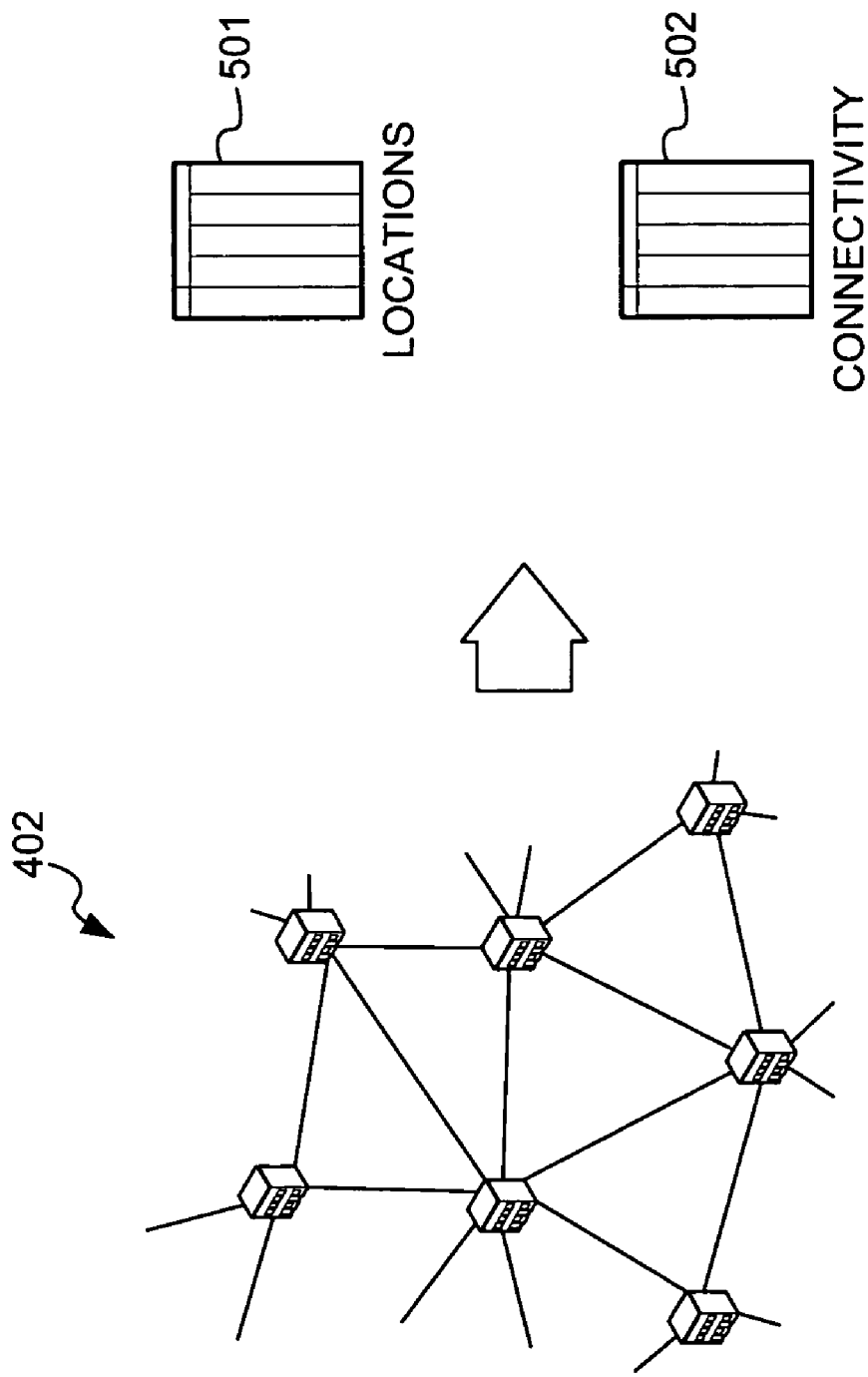
FIG. 5 depicts an example of information which may be used to describe a communications network according to one or more embodiments of the invention.

FIG. 5 depicts the types of information (in the form of data tables) which may be used to describe a given telecommunications network 402 for purposes of optimization. Such data tables may be formed in any electronic or machine-readable format, including database, spreadsheets, delimited text files, extensible markup language (XML) files, and so forth. These tables may be input on an as-needed basis, or may be input and stored for later use in multiple optimizations. All of the tables described below may be stored and/or accessed in program data 107, or in removable storage 109 or non-removable storage 110, or elsewhere on other computing devices 118.

Network node locations can be listed in a Location table 501, which includes the type of node, geographic coordinates, and other node information. Such a table 501 may include information about network nodes owned by one or more telecommunications service providers as well as information about network nodes under the control of particular telecommunications customers. Table 1.1 below lists the names and descriptions of data fields which may be utilized to describe network locations. The field list is not comprehensive, and additional fields may be appended, and others ignored.

In addition to knowing the locations of individual network nodes, a Connectivity table 502 may be used to keep track of connections between and among network nodes. Connectivity table 502 may include only information regarding certain types of connections between offices. For example, the connections listed in the Connectivity table 502 may be limited to optical fiber connection between network nodes. Such connections may be modeled without constraining for capacity in order to simplify the network model. Table 2.1 below lists names and descriptions of data fields which may be utilized to describe connectivity. As with all tables provided as examples, the field list is not comprehensive, and additional fields may be appended, and others ignored.

TABLE 2.1

Connectivity Field Descriptions

| Field Name | Field Description |
| --- | --- |
| ALOC | LOC_ID of the A (starting) office. Should be of CO or IND type. |
| ZLOC | LOC_ID of the Z (terminating) office. Should be of CO or IND type. |
| AIR_MILEAGE | Rational value indicating air-mileage from ALOC to ZLOC expressed in miles. If the value "−1" is inserted, the mileage may be automatically computed using the formula: $$\text{mileage}(A, Z) = \sqrt{\frac{(Z_v - A_v)^2 + (Z_h - A_h)^2}{10}}$$ Where: $A_h$ and $A_v$ are repectively the ALOC h-coord and v-coord values. $Z_h$ and $Z_v$ are respectively the ZLOC h-coord and v-coord values. |

TABLE 1.1

Location Field Descriptions

| Field Name | Description |
| --- | --- |
| LOC_ID | Unique, non-case sensitive identifier. Typically the CLLI (Common Language Location Identifier) code of the location. |
| LOC_TYPE | Values may include:<br>CO — Location is a central office under provider control.<br>EU — Location is an end user customer premise.<br>POP — Location is a point of presence customer premise.<br>IND — Location is a central office under independent control. |
| V_COORD | Integer value representing vertical coordinates in VH system. |
| H_COORD | Integer value representing horizontal coordinates in VH system. |
| FCC_ZONE | Integer value indicating Federal Communications Commission zone identifier. |
| MSA | Indicates whether the Metropolitan Statistical Area (MSA) is a relief or non-relief MSA |
| MUX | For CO and IND types, indicates if aggregation of DS0 and DS1 are permitted. Values may include: TERM, INTR, SINT |
| SWC | For EU and POP types, specifies the LOC_ID of the associated service wiring center (SWC). |

Examples of data which may be stored within the Location table 501 described above are reproduced below in Table 1.2.

TABLE 1.2

Examples of Location Data

| LOC_ID | LOC_TYPE | V_COORD | H_COORD | ZONE | MSA | MUX | SWC |
| --- | --- | --- | --- | --- | --- | --- | --- |
| RLGHNCMO | CO | 6344 | 1433 | 1 | 1 | TERM | |
| RLGHNCXX | EU | 6330 | 1435 | 1 | 1 | | RLGHNCMO |

Examples of data which may be stored within the Connectivity table 502 described above are reproduced below in Table 2.2.

TABLE 2.2

Examples of Connectivity Data

| ALOC | ZLOC | AIR_MILEAGE |
|---|---|---|
| RLGHNCMO | RLGHNCDU | −1 |
| RLGHNCMO | RLGHNCHO | 3.25 |

Additional data fields and/or tables may be utilized in order to further describe the physical attributes of the telecommunications network. For example, information regarding the types of interfaces available at the various network nodes may be utilized to aid in modeling the existing network, and for proposing new network use configurations for the particular customer or customers of interest.

Figure 6:
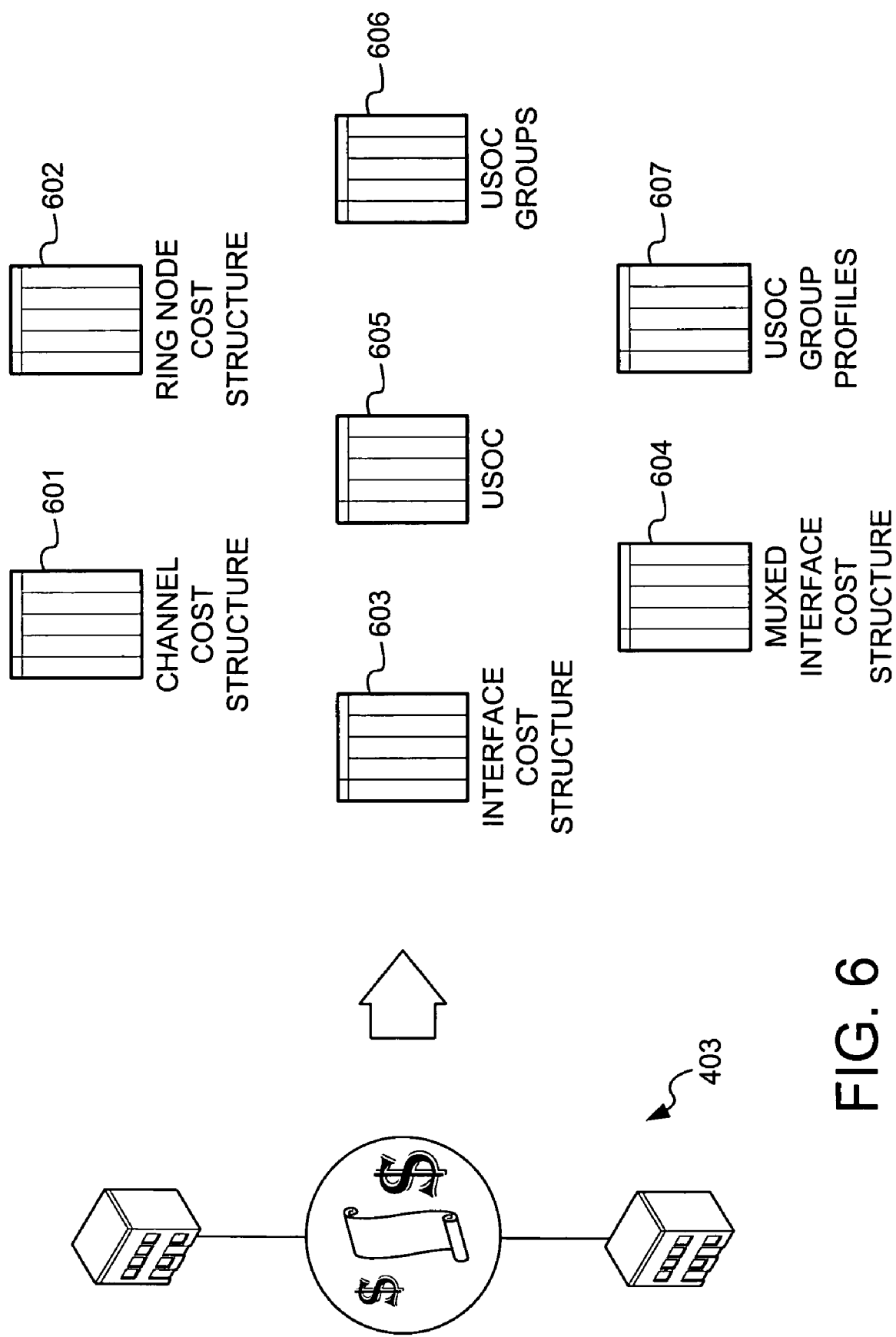
FIG. 6 depicts an example of information which may be used to describe the costs associated with a communications network according to one or more embodiments of the invention.

FIG. 6 depicts the types of information (in the form of data tables) which may be used to describe the costs and tariffs information 403 associated with a given telecommunications network for purposes of optimization. The components which make up the structure of a network use configuration can be divided up into at least four categories, including: channels, nodes, interfaces, and muxed interfaces. East of these categories of components can have a cost structure associated with them. A given network use configuration can then be priced based on the components used in the solution. Each component in a network, regardless of category, can be assigned a USOC (Universal Service Order Code), which can then be used to assign costs to the component. A data table may be used for each of component category for which the data fields are customized. A Channel Cost data table 601 may be utilized to describe costs associated with various types of network channels. Table 3.1 below lists names and descriptions of table data fields which may be utilized to assign one or more USOCs to various types of channels.

TABLE 3.1

Channel Cost Field Descriptions

| Field Name | Field Description |
|---|---|
| SYSTEM | Name of a system for which the USOC specified in USOC_LIST applies. Possible values include: SMARTRingOC3, SMARTRingOC12, SMARTRingOC48, SMARTRingOC48+, SMARTRingOC192, SMARTRingOC192+, DS0system, DS1system, LightGate1, LightGate2, LightGate3, LightGate4, LightGateSTS1, LightGateOC3, LightGateOC12, LightGateOC48, LightGateOC192 |
| CHANNEL_TYPE | Channel type for which the USOC specified in USOC_LIST applies. Possible values include: SR_IOC, SR_LC, SR_ACOC, SR_INC, DS_LC, DS_IOC, LG_LC, LG_OSWT, LG_OCUT, LG_IOC |
| MIN_RANGE | Minimum range in miles for which the USOC applies, ranging from 0 to 8191. |
| MAX_RANGE | Maximum range in miles for which the USOC applies, ranging from MIN_RANGE to 8191. −1 value represents infinite maximum. |
| BIT_RATE | Bit rate of channel for which the USOC applies. Possible values include: DS0, DS1, DS3, STS-1, OC3, OC12, OC48, OC192 |
| QTY_UNIT | Units used to quantify the USOC. If FIXED, the quantity of the USOC is 1, independent of the length of the channel. Otherwise the quantity is the length of the channel expressed in units of QTY_UNIT. Possible values include: FIXED, 0.25, 0.5, 1 |
| ADD_QTY | Quantity expressed in units of QTY_UNIT that is added to the quantity obtained from the air-mile calculation. May be negative, although subsequent total quantity will never be negative. |
| PLAN_GROUP | Indicates the plan group of the discounts that apply to the USOC. Plan groups may include: PG_DS0_DS1, PG_DS3 |
| USOC_LIST | List of applicable USOC(s). |

Examples of data which may be stored within the Channel Cost table 601 described above are reproduced below in Table 3.2.

TABLE 3.2

Examples of Channel Cost Data

| SYSTEM | CHANNEL TYPE | MIN RANGE | MAX RANGE | BIT RATE | QTY UNIT | ADD QTY | PLAN GROUP | USOC LIST |
|---|---|---|---|---|---|---|---|---|
| LightGate1 | LG_IOC | 0 | 8 | DS3 | FIXED | 0 | PG_DS3 | 1LPS8 |
| LightGate1 | LG_IOC | 0 | 8 | DS3 | 1 | 0 | PG_DS3 | 1LPE8 |
| LightGate1 | LG_IOC | 9 | 25 | DS3 | FIXED | 0 | PG_DS3 | 1LPS9 |
| LightGate1 | LG_IOC | 9 | 25 | DS3 | 1 | 0 | PG_DS3 | 1LPE9 |
| LightGate1 | LG_IOC | 0 | −1 | DS3 | FIXED | 0 | PG_DS3 | HFSC6 |
| LightGate1 | LG_IOC | 0.5 | −1 | DS3 | 0.5 | −1 | PG_DS3 | 1LPEA |
| SMARTRingOC48 | SR_IOC | 0 | −1 | 1 | 0.25 | 0 | PG_DS3 | 1HFX |

A Ring Node Cost data table 602 can be used to describe the unique costs associated with ring nodes. Table 4.1 below lists names and descriptions of table data fields which may be utilized to assign one or more USOCs to various types of ring nodes.

TABLE 4.1

Ring Node Cost Field Descriptions

| Field Name | Field Description |
| --- | --- |
| SYSTEM | Name of a system for which the USOC specified in USOC_LIST applies. Possible values include: SMARTRingOC3, SMARTRingOC12, SMARTRingOC48, SMARTRingOC48+, SMARTRingOC192, SMARTRingOC192+. |
| LOC_TYPE | Type of location where node is located. Possible values include: CO, CP |
| PLAN_GROUP | Indicates the plan group of the discounts that apply to the USOC. Plan groups may include: PG_DS0_DS1, PG_DS3 |
| USOC_LIST | List of applicable USOC(s). |

Examples of data which may be stored within the Ring Node Cost data table 602 described above are reproduced below in Table 4.2.

TABLE 4.2

Examples of Ring Node Cost Data

| SYSTEM | LOC_TYPE | PLAN_GROUP | USOC_LIST |
| --- | --- | --- | --- |
| SMARTRingOC3 | CP | PG_DS3 | SHNC3 |
| SMARTRingOC3 | CO | PG_DS3 | SHNH3 |
| SMARTRingOC12 | CP | PG_DS3 | SHNC1 |
| SMARTRingOC12 | CO | PG_DS3 | SHNH1 |
| SMARTRingOC48 | CP | PG_DS3 | SHNN8 |
| SMARTRingOC48 | CO | PG_DS3 | SHNH8 |

An Interface Cost data table 603 can be used to describe the unique costs associated with interfaces within a network. Table 5.1 below lists names and descriptions of table data fields which may be utilized to assign one or more USOCs to various types of interfaces. In addition to the list of possible INTERFACE values noted below, additional interfaces may work with Asynchronous Transfer Mode (ATM), Wave-Length, Frame Relay, and so forth.

TABLE 5.1

Interface Cost Field Descriptions

| Field Name | Field Description |
| --- | --- |
| SYSTEM | Name of a system for which the USOC specified in USOC_LIST applies. Possible values include: SMARTRingOC3, SMARTRingOC12, SMARTRingOC48, SMARTRingOC48+, SMARTRingOC192, SMARTRingOC192+, DS0system, DS1system, LightGate1, LightGate2, LightGate3, LightGate4, LightGateSTS1, LightGateOC3, LightGateOC12, LightGateOC48, LightGateOC192. |
| INTERFACE | Interface to which the USOC applies. Possible values include: DS1, DS3, DS3_DS1, STS1_DS1, STS1, OC3, OC12, OC48, OC192. DS3_DS1 and STS1_DS1 are 28 DS1 channel systems. |
| ALOC_TYPE | Type of site where the interface is located. Possible values include: ANY, CUCI, and COCI. |
| ZLOC_TYPE | Type of the remote site to which the interface is connected. Possible values include: ANY, CUCI, and COCI. |
| PLAN_GROUP | Indicates the plan group of the discounts that apply to the USOC. Plan groups may include: PG_DS0_DS1, PG_DS3 |
| USOC_LIST | List of applicable USOC(s). |

Examples of data which may be stored within the Interface Cost data table 603 described above are reproduced below in Table 5.2.

TABLE 5.2

Examples of Interface Cost Data

| SYSTEM | INTERFACE | ALOC_TYPE | ZLOC_TYPE | PLAN GROUP | USOC LIST |
|---|---|---|---|---|---|
| LightGate1 | DS3 | CUCI | ANY | PG_DS3 | IPQEP |
| LightGate1 | DS3 | COCI | CUCI | PG_DS3 | IPQEC |
| LightGate1 | DS3 | COCI | COCI | PG_DS3 | IPQE3 |
| LightGate4 | DS1 | COCI | CUCI | PG_DS0_DS1 | IPQE1 |
| LightGateOC3 | DS1 | CUCI | ANY | PG_DS3 | IPQF1 |
| LightGateOC3 | DS1 | COCI | CUCI | PG_DS3 | IPQE8 |
| LightGateOC3 | DS3_DS1 | COCI | CUCI | PG_DS3 | MQ3CO |
| LightGateOC3 | DS3_DS1 | COCI | COCI | PG_DS3 | MQ3C1 |
| LightGateOC3 | STS3_DS1 | COCI | COCI | PG_DS3 | IPQE7 |

A Muxed Interface Cost data table 604 can be used to describe the cost structure of interfaces of lower rate circuits carried on higher rate circuits. Table 6.1 below lists names and descriptions of table data fields which may be utilized to assign one or more USOCs to various types of muxed interfaces.

TABLE 6.1

Muxed Interface Cost Field Descriptions

| Field Name | Field Description |
|---|---|
| BIT_RATE | Bit rate of the lower rate circuit. Possible values include: DS0, DS1. |
| CARRIER_RATE | Bit rate of the higher rate circuit. Possible values include: DS1_DS0, DS3_DS1, STS1_DS1 |
| HOST_SYSTEM | Host system for the higher rate circuit. Possible values include: SMARTRingOC3, SMARTRingOC12, SMARTRingOC48, SMARTRingOC48+, SMARTRingOC192, SMARTRingOC192+, DS0system, DS1system, LightGate1, LightGate2, LightGate3, LightGate4, LightGateSTS1, LightGateOC3, LightGateOC12, LightGateOC48, LightGateOC192. |
| PLAN_GROUP | Indicates the plan group of the discounts that apply to the USOC. Plan groups may include: PG_DS0_DS1, PG_DS3 |
| USOC_LIST | List of applicable USOC(s). |

Examples of data which may be stored within the Interface Cost data table 603 described above are reproduced below in Table 5.2.

TABLE 6.2

Examples of Muxed Interface Cost Data

| BIT_RATE | CARRIER_RATE | HOST_SYSTEM | PLAN_GROUP | USOC_LIST |
|---|---|---|---|---|
| DS1 | STS1_DS1 | LightGateOC3 | PG_DS0_DS1 | IPQE8 |
| DS1 | DS3_DS1 | LightGateOC3 | PG_DS0_DS1 | IPQEA |
| DS1 | DS3_DS1 | LightGate1 | PG_DS0_DS1 | IPQE1 |

A USOC data table 605 can be used to track information relating to individual USOCs. In addition, USOCs can be grouped together, possibly to provide discounts for sets of USOCs. The assignment of USOCs to USOC Groups can be tracked in a USOC Group table 606, and information about USOC Groups can be stored in a USOC Group Profile table 607. Tables 7, 8, and 9 below list possible field names and field descriptions for each of these three data tables.

TABLE 7

USOC Field Descriptions

| Field Name | Field Description |
|---|---|
| USOC | Universal Service Order Code |
| ZONE | Zone to which the recurring tariff applies. |
| PLAN | Plan to which the recurring tariff applies. Possible values may include: ACP_A, ACP_B, MTM, A, B, C |
| MSA | Indicates whether the Metropolitan Statistical Area (MSA) is a relief or non-relief MSA |
| RECURRING | Recurring tariff for the corresponding (USOC, ZONE, PLAN, MSA) configuration. |

TABLE 8

USOC Group Profile Field Descriptions

| Field Name | Field Description |
| --- | --- |
| USOC_GROUP | The name of the credit/discount profile. |
| PLAN | Discount plan specifying how and when the discount is applied. Possible values may include PSIP, ACP. |
| ZONE | Zone to which the discount applies. Possible values may include 0, 1, 2, 3, ANY. |
| DISCOUNT | Percentage discount applied to the USOC, in the range of 0 to 100. |

TABLE 9

USOC Group Field Descriptions

| Field Name | Field Description |
| --- | --- |
| USOC | Universal Service Order Code |
| USOC_GROUP | The USOC Group to which this USOC is assigned. |

Figure 7:
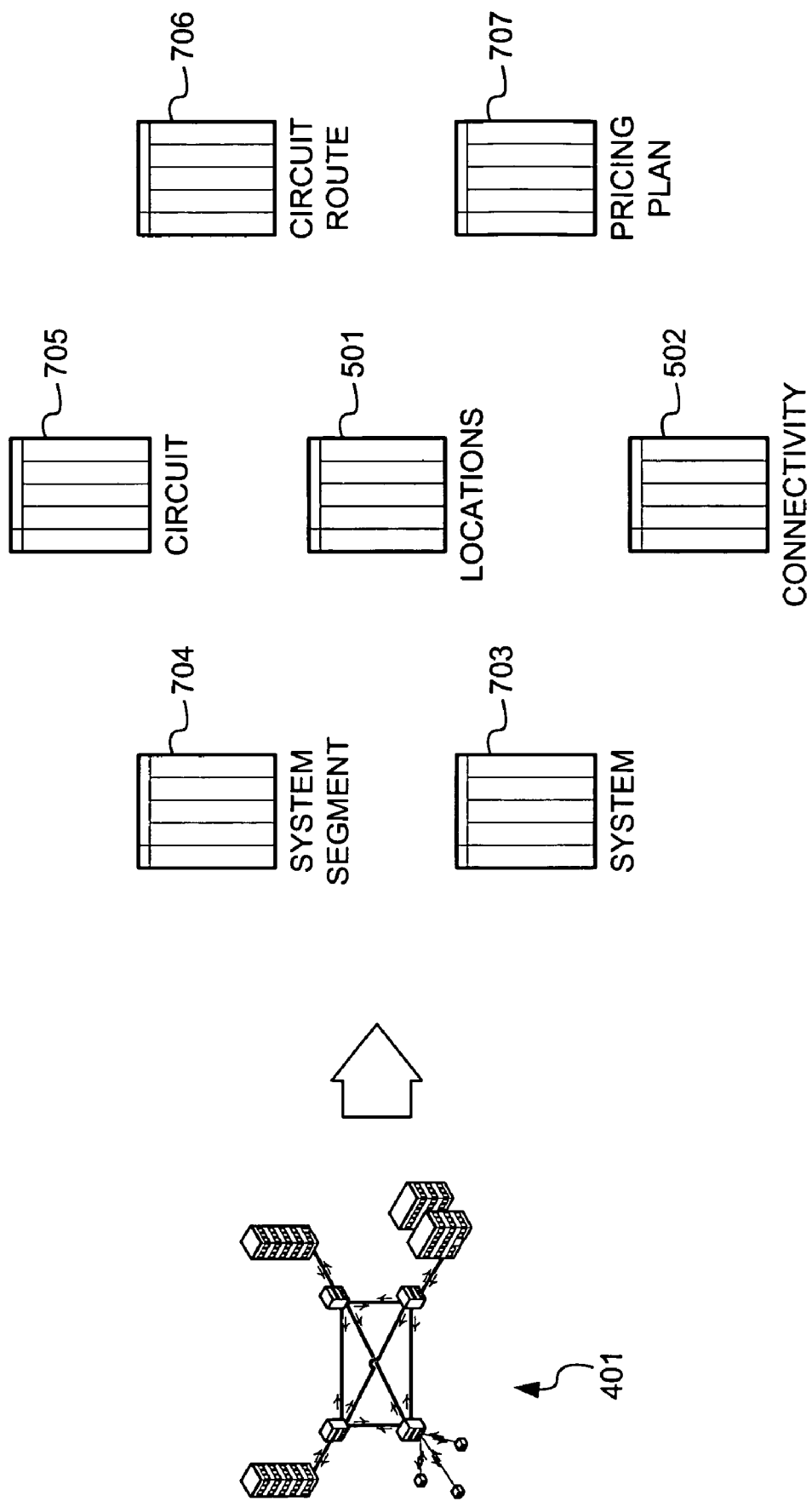
FIG. 7 depicts an example of information which may be used to describe current network usage information according to one or more embodiments of the invention.

In addition to the information described in the table and field descriptions above, network optimization application 120 may require information about a customer's or group of customers' current network usage in order to best determine a preferred network use configuration. This information may be available through data mining of a service provider's billing records. The process of converting data from billing records into useful input can be automated on a computer. Regardless of source, the data can be formatted in the form of tables which can be used as input to network optimization application 120. FIG. 7 depicts the types of information (in the form of data tables) which may be used to describe current network usage 401 for purposes of optimization.

Locations table 501 may be the same table as previously described with respect to FIG. 5. Although this table 501 supplies information regarding the broader telecommunications network, it will also contain relevant customer locations which are particular to the current optimization being undertaken. Thus, network node (e.g., central office) location information is supplemented on a case-by-case basis with customer premise location information. In addition, Connectivity table 502 containing network node connectivity information is supplemented with information about connections to customer premises for case-specific analysis.

Additional information about current customer usage needed for optimization may include information about systems, system segments, circuits, circuit routes, and customer-specific pricing plans. As with the tables described above, these tables merely present one format of data for use as input in an optimization. Additional fields, tables, and other information may be included which will produce essentially the same output.

A System data table 703 can be used to describe the systems in use within a telecommunications network. Table 10.1 below lists names and descriptions of table data fields which may be utilized to identify and describe systems.

TABLE 10.1

System Field Descriptions

| Field Name | Field Description |
| --- | --- |
| SYS_ID | A unique identifier for a system. |
| SYS_TYPE | Specifies the type of the system. Possible values include: SMARTRingOC3, SMARTRingOC12, SMARTRingOC48, SMARTRingOC48+, SMARTRingOC192, SMARTRingOC192+, DS0system, DS1system, LightGate1, LightGate2, LightGate3, LightGate4, LightGateSTS1, LightGateOC3, LightGateOC12, LightGateOC48, LightGateOC192. |

Examples of data which may be stored within the System data table 703 described above are reproduced below in Table 10.2.

TABLE 10.2

Examples of System Data

| SYS_ID | SYS_TYPE |
| --- | --- |
| NN4PSG | LightGateOC3 |
| NN6PSG | LightGateOC12 |
| NN7PSG | LightGateOC3 |
| NN5PSG | SMARTRingOC48 |

A system can be comprised of one or more segments, each of which can be connected between two network nodes, identified in the Locations table 501. A System Segment table 704 can be used to identify and describe the segments of a system. Table 11.1 below lists names and descriptions of table data fields which may be utilized to identify and describe system segments.

TABLE 11.1

System Segment Field Descriptions

| Field Name | Field Description |
| --- | --- |
| SGMT_ID | Unique segment identifier. |
| P_SYS_ID | System identifier referring to the parent system from the System table. |
| ALOC | LOC_ID of the A location from the Locations table. |
| ZLOC | LOC_ID of the Z location from the Locations table. |
| A_ADM | Indicates the presence of an Add/Drop Multiplexer (ADM) at the A location. Possible values include:<br>0 No ADM. Interfaces not allowed. Through location.<br>1 LightGate termination or SMARTRing node. Interfaces allowed. |
| Z_ADM | Indicates the presence of an ADM at the Z location. Same possible values as A_ADM. |

Examples of data which may be stored within the System Segment table 704 described above are reproduced below in Table 11.2.

TABLE 11.2

Examples of System Segment Data

| SGMT_ID | P_SYS_ID | ALOC | ZLOC | A_ADM | Z_ADM |
| --- | --- | --- | --- | --- | --- |
| NN4PSG_RLGHNCXX_RLGHNCMO | NN4PSG | RLGHNCXX | RLGHNCMO | 1 | 0 |
| NN6PSG_RLGHNCMO_RLGHNCHO | NN6PSG | RLGHNCMO | RLGHNCHO | 1 | 1 |
| NN7PSG_RLGHNCHO_RLGHNCYY | NN7PSG | RLGHNCHO | RLGHNCYY | 0 | 1 |
| NN5PSG_RLGHNCMO_RLGHNCXX | NN5PSG | RLGHNCMO | RLGHNCXX | 1 | 1 |
| NN5PSG_RLGHNCXX_RLGHNCMO | NN5PSG | RLGHNCXX | RLGHNCMO | 1 | 0 |
| NN5PSG_RLGHNCMO_RLGHNCHO | NN5PSG | RLGHNCMO | RLGHNCHO | 0 | 0 |
| NN5PSG_RLGHNCDU_RLGHNCHO | NN5PSG | RLGHNCDU | RLGHNCHO | 1 | 0 |
| MN5PSG_RLGHNCDU_RLGHNCMO | NN5PSG | RLGHNCDU | RLGHNCMO | 1 | 1 |

A circuit consists of interfaces interconnecting a succession of circuit segments. Each segment of the circuit refers to a higher rate intermediate circuit or system segment acting as a Circuit Facility Assignment (CFA) for the circuit. A Circuit table 705 can be used to describe circuits in use in a telecommunications network. Table 12.1 below lists names and descriptions of table data fields which may be utilized to identify and describe circuits. As with other tables, the selection of fields and tables is merely one form of circuit itemization. Other types of data structures (e.g., object databases, flat files, etc.) and other fields may be utilized to the same end.

TABLE 12.1

Circuit Field Descriptions

| Field Name | Field Description |
| --- | --- |
| CKTID | Unique circuit identifier. |
| ALOC | LOC_ID of the A location from the Locations table. |
| ZLOC | LOC_ID of the Z location from the Locations table. |
| CKT_TYPE | Specifies the type of the circuit. Possible values include:<br>NATIVE    Circuit is not CFA of any other circuits.<br>INTERMEDIATE    Circuit is CFA of lower bit-rate circuits. |
| A_INTERFACE | Specifies the type of interface at the A location. Possible values include: DS0, DS1, DS3, DS3_DS1, STS1, STS1_DS1, OC3, OC12, OC48, OC192. |
| Z_INTERFACE | Specifies the type of interface at the Z location. Possible values include: DS0, DS1, DS3, DS3_DS1, STS1, STS1_DS1, OC3, OC12, OC48, OC192. |
| P_SYSTEM_TYPE | Specifies the preferred system type for carrying this circuit. Possible values include: ANY, LIGHTGATE, SMARTRING |

Examples of data which may be stored within the Circuit table 705 described above are reproduced below in Table 12.2.

TABLE 12.2

Examples of Circuit Data

| CKTID | ALOC | ZLOC | CKT_TYPE | A_INTERFACE | Z_INTERFACE | P_SYSTEM_TYPE |
| --- | --- | --- | --- | --- | --- | --- |
| DS1.1 | CP1 | MO | NATIVE | DS1 | DS1 | ANY |
| DS1.2 | CP2 | HO | NATIVE | DS1 | DS3 | ANY |

TABLE 12.2-continued

Examples of Circuit Data

| CKTID | ALOC | ZLOC | CKT_TYPE | A_INTERFACE | Z_INTERFACE | P_SYSTEM_TYPE |
|---|---|---|---|---|---|---|
| DS1.3 | CP3 | JO | NATIVE | DS3 | DS3 | ANY |
| OC12.4 | MO | DU | INTERMEDIATE | | | ANY |

Circuit route information may be itemized in a Circuit Route table 706 (or other data structure). Table 13.1 below describes the data fields and field descriptions which may be used to store circuit route segment information.

TABLE 13.1

Circuit Route Field Descriptions

| Field Name | Field Description |
|---|---|
| P_CKTID | Unique circuit identifier of the parent circuit. |
| HOST_SGMT_TYPE | The type of host entity used as Circuit Facility Assignment (CFA). Possible values include: SYSTEM, CIRCUIT. |
| HOST_SGMT_ID | If HOST_SGMT_TYPE is SYSTEM, then this is the SYS_SGMT_ID of the host system. If HOST_SGMT_TYPE is CIRCUIT, then this is the CKTID of the host circuit. |
| TIME_SLOT | Optional integer identifying the time slot of the host system or circuit. For the following bit rates, the values include:<br>DS0 on DS1: 1, 2, 3, . . . , 24<br>DS1 on DS3: 1, 2, 3, . . . , 28<br>DS3 on OC3: 1, 2, 3<br>DS3 on OC12: 1, 2, 3, . . . , 12<br>DS3 on OC48: 1, 2, 3, . . . , 48<br>DS3 on OC192: 1, 2, 3, . . . , 192<br>OC3 on OC12: 1, 4, 7, 10<br>OC3 on OC48: 1, 4, 7, . . . , 46<br>OC3 on OC192: 1, 4, 7, . . . , 190<br>OC12 on OC48: 1, 13, 25, 7<br>OC12 on OC192: 1, 13, 25, . . . , 181<br>OC48 on OC192: 1, 49, 97, 145 |
| A_INTERFACE | Specifies the type of interface at the A location. Possible values include: DS0, DS1, DS3, DS3_DS1, STS1, STS1_DS1, OC3, OC12, OC48, OC192. |
| Z_INTERFACE | Specifies the type of interface at the Z location. Possible values include: DS0, DS1, DS3, DS3_DS1, STS1, STS1_DS1, OC3, OC12, OC48, OC192. |

Examples of data which may be stored within the Circuit Route table 706 described above are reproduced below in Table 13.2.

TABLE 13.2

Examples of Circuit Route Data

| P_CKTID | HOST_SGMT_TYPE | HOST_SGMT_ID | TIME_SLOT | A_INTERFACE | Z_INTERFACE |
|---|---|---|---|---|---|
| DS3.3 | SYSTEM | LG.OC3.1 | | DS3 | DS3 |
| DS3.3 | SYSTEM | SR.OC12.2 | | DS3 | DS3 |
| DS3.3 | SYSTEM | LG.OC3.3 | | DS3 | DS3 |
| DS3.3 | SYSTEM | OC12.4 | | DS3 | DS3 |

Pricing plan information can be summarized in Pricing Plan table 707, which provides a listing of pricing plans and their respective attributes. This information can be utilized in calculating discounts when determining the cost and/or tariffs associated with a particular pricing plan. Table 14 below describes the data fields and field descriptions which may be used to store such information.

TABLE 14

Pricing Plan Field Descriptions

| Field Name | Field Description |
|---|---|
| PLAN_GROUP | Plan group identification. Possible values include: PG_DS0_DS1, PG_DS3 |
| PLAN | User commitment level. Possible values include: MTM, A, B, C |

TABLE 14-continued

Pricing Plan Field Descriptions

| Field Name | Field Description |
|---|---|
| ACP_PLAN | User commitment level. Possible values include: ACP_A, ACP_B. This field may be ignored if PLAN does not equal MTM, or if ACP is 0%. |
| ACP | Ratio of ACP commitment from 0% to 100%. Ignored if PLAN is not MTM. |
| TSP | Indicates whether the plan group is eligible for a TSP discount. Possible values include: 1, 0. |
| PSIP | Indicates whether the plan group is eligible for a PSIP discount. Possible values include: 1, 0. |
| WS_TSP | Indicates whether the plan group is eligible for a schedule 3 discount. Ignored if PSIP is 0. |
| TSP_D | TSP discount in range of 0% to 100%. Ignored if TSP is 0. |
| SCH_1 | Schedule 1 discount ranging from 0% to 100%. Ignored if PSIP is 0. |
| SCH_2 | Schedule 2 discount ranging from 0% to 100%. Ignored if PSIP is 0. |
| SCH_3 | Schedule 3 discount ranging from 0% to 100%. Ignored if PSIP is 0. |

Each of these tables may serve as a component input to an optimization to be performed by network optimization application 120. The data stored or represented in these tables may be entered via software import or by other electronic means. Alternatively, the data in any or all of these tables may be entered by manual input through the use of a graphical user interface, mouse and keyboard, or by other human input methods. Portions of the data entered may be stored for future optimizations, for example the portions of a telecommunications network which are constant (e.g., the locations and interconnectivity of central offices). Customer-specific data may be culled from billing records, usage records, or through manually generated estimates or predictions of customer use.

Once all inputs are received by network optimization application 120, an optimization can be performed in order to produce a preferred use configuration. The network optimization application 120 may then produce one or more reports describing the calculated preferred use configuration. In addition, the network optimization application 120 may enable a graphical user interface to permit interactive manipulation and inspection of the proposed design.

Figure 8:
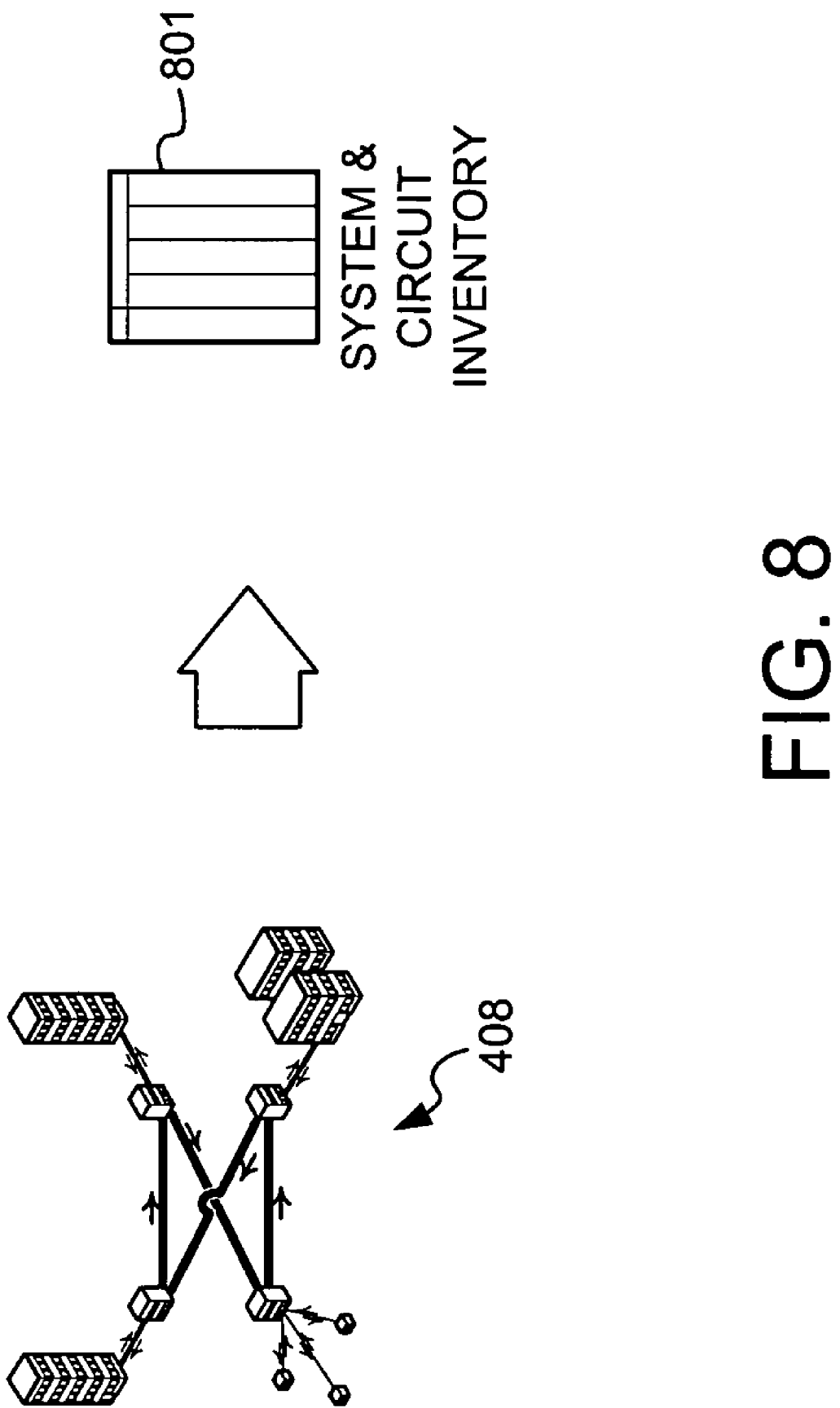
FIG. 8 depicts an example of information which may be used to describe a preferred network use configuration according to one or more embodiments of the invention.

FIG. 8 depicts the types of data which may be output by network optimization application 120. Among the possible reports describing use configuration 408, an Inventory data table 801 may include the details of the system and the circuit components used in the proposed design, as well as tariff information. Table 15 below provides possible data fields used by Inventory table 801 to describe the proposed design. Although shown as table field definitions, the information described in this table may be formatted in any useful fashion, such as in a formatted report, a text file, a presentation, an interactive spreadsheet, and so forth.

TABLE 15

Inventory Field Descriptions

| Field Name | Field Description |
|---|---|
| ENTITY_TYPE | Type of the Entity containing the USOC. Possible values include: SYSTEM, CIRCUIT. |
| ENTITY_ID | Unique ID for the Entity. |
| ELEMENT_TYPE | Indicates whether the element corresponds to a NODE, a SEGMENT, or an INTERFACE. |
| ELEMENT_ID | Identifies the element where the USOC is located. If ELEMENT_TYPE is NODE or INTERFACE, then this value is the LOC_ID of the associated node. If ELEMENT_TYPE is SEGMENT, then this value is the SGMNT_ID of the corresponding system segment. |
| ZONE | Indicates zone pricing used, if any. |
| MSA | Indicates whether the MSA has RELIEF or NONRELIEF pricing. |
| USOC_TYPE | Identifies the type of the USOC. Possible values include: SR_LC, SR_ACOC, SR_IOC, SR_INC, SR_CON, SR_CN, LG_LC, LG_IOC, DS_LC, DS_IOF, DS0, DS1, DS3, DS3_DS1, STS1, STS1_SYS, OC3, OC12, OC48 |
| USOC | The Universal Service Order Code associated with this inventory item. |
| QUANTITY | The Quantity of the USOC. |
| RECURRING | Recurring cost after credit is applied, computed according to the USOC, the QUANTITY, and a service plan. |

Other data outputted by network optimization application 120 may include a system configuration report, which may include the details of how proposed systems are configured. In addition, a circuit configuration report may be provided which describes how native and intermediate circuits are to be configured.

Figure 9:
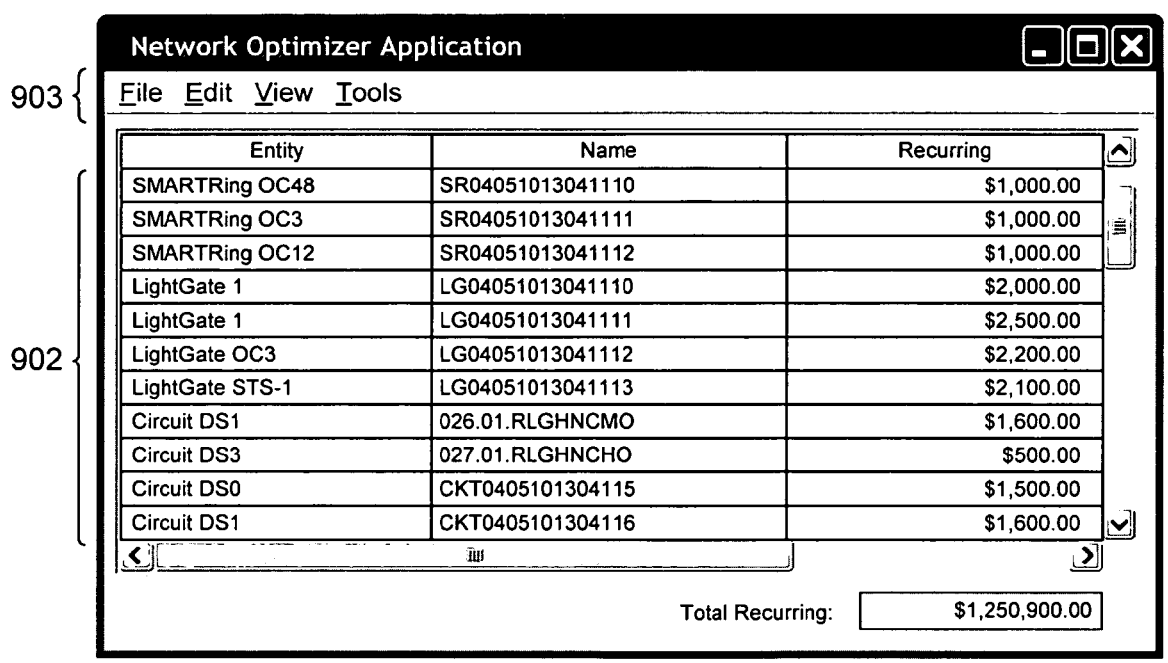
FIG. 9 depicts an example of an interface provided to display the elements of a preferred network use configuration according to one or more embodiments of the invention.

FIG. 9 depicts an example of a graphical user interface 901 which may be utilized by network optimization application 120. Interface 901 displays a list 902 of network elements that are part of a preferred network use configuration. List 902 here includes an element type (e.g., topology ring, OC48 or Circuit DS1), a unique name for the element, and a recurring charge for the element. A user of the network optimization application 120 may modify the constraints described in the above input tables and re-run the optimization to arrive at a new and possible different preferred network use configuration. Similarly, a user of the network optimization application 120 may run an optimization to create the preferred network use configuration, and then tweak the optimized solution manually before presenting the final product.

From interface 901, a user can access details about the proposed solution, a user may be able to create new projects, open an existing project, save the current project, revert to a previously saved version and so forth. A user may also be able to edit the existing project by creating a new system or circuit. Further, the user may access summary information about the project, pricing plan information, pricing functionality, as well as execute a new optimization. A user may also obtain details about an individual entity, or even delete a selected entity. Each of these functions may be accessed via menu 903 displayed on interface 901, through pop up or right click menus, using shortcut keys, and so forth.

With regard to pricing the network use configuration, a user may access a pricing summary which provides information on any applicable discounts based on the current usage and based on other settings. In addition, a user can price out the current use configuration using the optimization tool which in turn utilizes the information stored in the above-described data tables. As changes are made to the use configuration, either manually or by automated processes, the pricing functionality can re-price the total use configuration.

Figure 10:
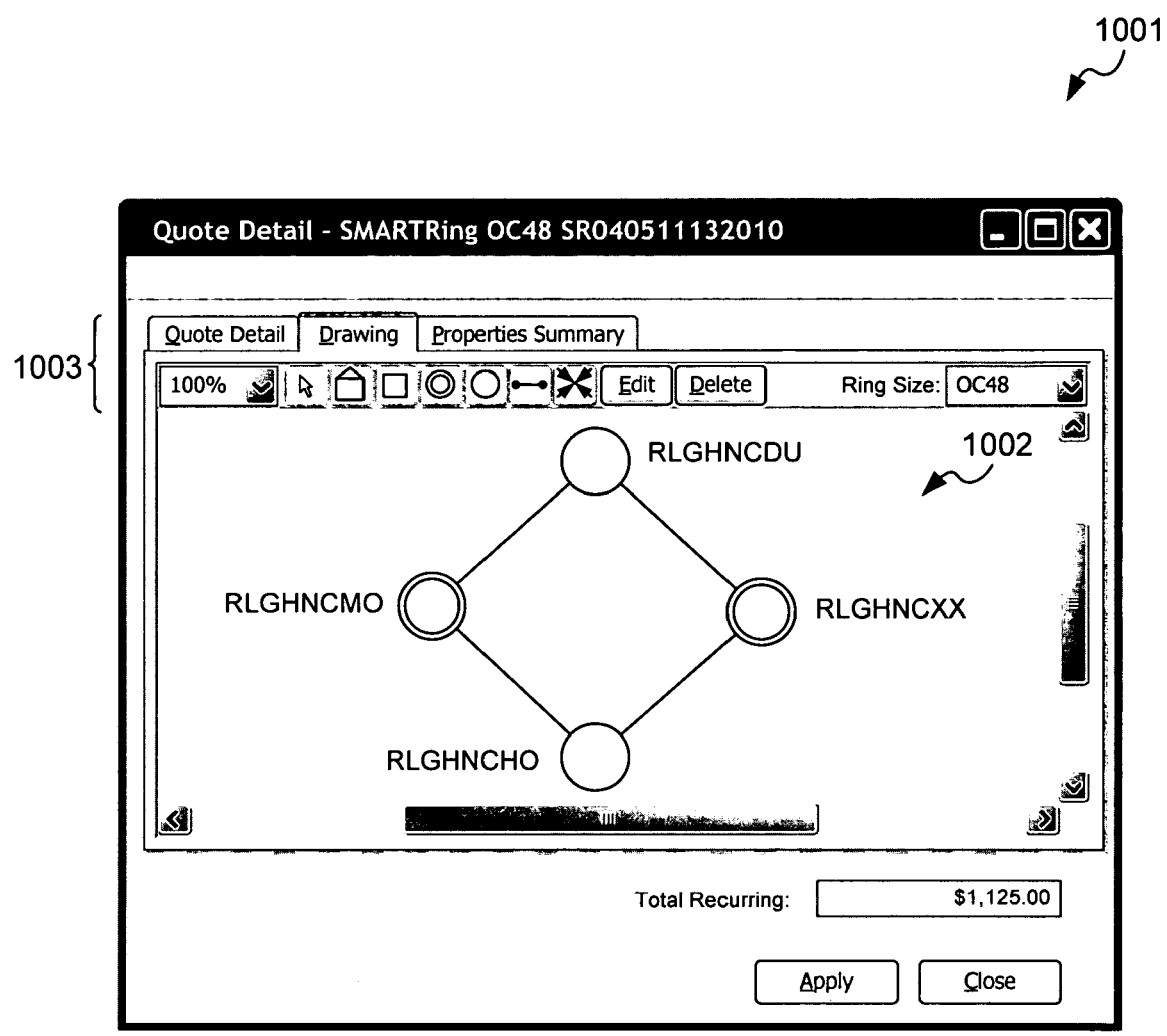
FIG. 10 depicts an example of an interface provided to display the details of a particular network element according to one or more embodiments of the invention.

FIG. 10 depicts a second example of a graphical user interface 1001 which may be utilized by network optimization application 120. Interface 1001 prevents additional details about an entity selected from interface 901. The interface includes tabs and tools 1003, which allow the user to access and modify different information about the entity. For example, a Quote Detail tab may include specifications and costs associated with the particular entity and the network components which may be utilized by the entity. A Drawing tab may include a visual representation 1002 of the entity. Here, representation 1002 includes information about the ring being viewed, and includes the names of central offices being utilized by the ring configuration. The Drawing tab may include tools which allow a user to modify the ring, including adding or removing nodes, circuits and/or systems, changing the bandwidth allocated to the ring, and so forth.

While methods and systems embodying the present invention are shown by way of example, it will be understood that the invention is not limited to these embodiments. The methods and systems described are merely examples of the invention, the limits of which are set forth in the claims which follow. Those skilled in the art may make modifications, particularly in light of the foregoing teachings.

We claim:

1. A method for modeling use of a telecommunications network, the method comprising:
   receiving a first collection of data items, wherein each data item of the first collection includes location information about a node on the telecommunications network;
   receiving a second collection of data items, wherein each data item of the second collection includes information about a link between nodes on the telecommunications network, wherein at least some of the nodes are owned by different service providers;
   receiving a third collection of data items, wherein each data item of the third collection includes information about a tariff associated with an element of the telecommunications network and wherein the third collection includes information about a Universal Service Order Code (USOC) for assigning costs to elements of the telecommunications network;
   receiving a fourth collection of data items, wherein each data item of the fourth collection includes information about a customer's use of a network system in the telecommunications network and wherein the fourth collection includes information about a customer's use of a ring-type system;
   receiving a fifth collection of data items, wherein each data item of the fifth collection includes information about channels in the telecommunications network;
   receiving a sixth collection of information, wherein the sixth collection includes information about various types of interfaces available on nodes of the telecommunications network;
   generating a model of the telecommunications network utilizing the first collection, the second collection, the third collection, the fourth collection, the fifth collection, and the sixth collection; and
   optimizing, at a processor, the customer's use of the telecommunications network using the model, wherein optimizing includes determining a lowest cost use of the telecommunications network based on ring node cost data, channel cost data, interface cost data, muxed interface cost data, and USOC data.

2. The method of claim 1, wherein USOCs are grouped into sets, and discounts are provided for sets of USOCs.

3. The method of claim 1, wherein the second collection includes information about geographic distance between nodes on the telecommunications network.

4. The method of claim 1, further comprising:
   providing a graphical user interface with which the model may be accessed by a user; and
   providing a graphical view of the ring-type system, wherein the user may modify the ring-type system using the graphical view.

5. The method of claim 1, wherein the fourth collection is derived, at least in part, from billing records of the customer.

6. The method of claim 1, wherein the first collection comprises both a central office and a customer premises.

7. A system of modeling a telecommunications network, the system comprising:
   a processor, a display, in communication with the processor;
   a memory, in communication with the processor and storing instructions executable by the processor, the instructions comprising:
      receiving a first collection of data items, wherein each data items of the first collection includes location information about a node in the telecommunications network;
      receiving a second collection of data items, wherein each data item of the second collection includes information about a link between nodes of the telecommunications network, wherein at least some of the nodes are owned by different service providers;
      receiving a third collection of data items, wherein each data item of the third collection includes information about a tariff associated with an element of the telecommunications network, and wherein the third collection includes information about a Universal Service Order Code (USOC) for assigning costs to elements of the telecommunications network;
      receiving a fourth collection of data items, wherein each data item of the fourth collection includes information about a customer's use of a network system in the telecommunications network and wherein the fourth collection includes information about a customer's use of a ring-type system;
      receiving a fifth collection of data items, wherein each data item of the fifth collection includes information about channels in the telecommunications network;

receiving a sixth collection of information, wherein the sixth collection includes information about various types of interfaces available on nodes of the telecommunications network;

generating a model of the telecommunications network utilizing the first collection, the second collection, the third collection, the fourth collection, the fifth collection, and the sixth collection;

providing a graphical user interface on the display allowing a user access to the model; and optimizing the customer's use of the telecommunications network using the model, wherein optimizing includes determining a lowest cost use of the telecommunications network based on ring node cost data, channel cost data, interface cost data, muxed interface cost data, and USOC data.

8. The system of claim 7, wherein USOCs are grouped into sets, and discounts are provided for sets of USOCs.

9. The system of claim 7, wherein the second collection includes information about geographic distance between nodes on the telecommunications network.

10. The system of claim 7, the instructions further comprising providing a graphical view of the ring-type system, wherein the user may modify the ring-type system using the graphical views.

11. The system of claim 7, wherein the fourth collection is derived, at least in part, from billing records of the customer.

12. The system of claim 7, wherein the first collection comprise both a central office and a customer premise.

13. A non-transitory computer readable storage medium for storing instructions for modeling a telecommunication network, wherein the instructions, when executed by a computer, cause the computer to perform:

receiving a first collection of data items, wherein each data items of the first collection includes location information about a node in the telecommunications network;

receiving a second collection of data items, wherein each data item of the second collection includes information about a link between nodes of the telecommunications network, wherein at least some of the nodes are owned by different service providers;

receiving a third collection of data items, wherein each data item of the third collection includes information about a tariff associated with an element of the telecommunications network, wherein the third collection includes information about a Universal Service Order Code (USOC) for assigning costs to elements of the telecommunications network;

receiving a fourth collection of data items, wherein each data items of the fourth collection includes information about a customer's use of a network system in the telecommunications network and wherein the fourth collection includes information about a customer's use of a ring-type system;

receiving a fifth collection of data items, wherein each data item of the fifth collection includes information about channels in the telecommunications network;

receiving a sixth collection of information, wherein the sixth collection includes information about various types of interfaces available on nodes of the telecommunications network;

generating a model of the telecommunications network utilizing the first collection, the second collection, the third collection, the fourth collection, the fifth collection, and the sixth collection;

optimizing, at a processor, the customer's use of the telecommunications network using the model, wherein optimizing includes determining a lowest cost use of the telecommunications network based on ring node cost data, channel cost data, interface cost data, muxed interface cost data, and USOC data.

14. The non-transitory computer readable medium of claim 13, wherein the first collection comprises both a central office and a customer premise.

15. The non-transitory computer readable medium of claim 13, wherein USOCs are grouped into sets, and discounts are provided for sets of USOCs.

* * * * *